(12) United States Patent
Jen

(10) Patent No.: US 6,926,854 B2
(45) Date of Patent: Aug. 9, 2005

(54) PROCESS OF MAKING POLYESTER FINE DENIER MULTIFILAMENT

(75) Inventor: Zo-Chun Jen, Taipei (TW)

(73) Assignee: Nan Ya Plastics Corporation, Taipei (TW)

(*) Notice: Subject to any disclaimer, the term of this patent is extended or adjusted under 35 U.S.C. 154(b) by 26 days.

(21) Appl. No.: 10/602,820

(22) Filed: Jun. 25, 2003

(65) Prior Publication Data

US 2005/0006812 A1 Jan. 13, 2005

(51) Int. Cl.$^7$ .............. D01D 5/092; D01D 5/253; D01F 6/62; D02G 3/02
(52) U.S. Cl. .............. 264/103; 264/169; 264/177.13; 264/211.12; 264/211.14
(58) Field of Search .............. 264/103, 169, 264/177.13, 211.12, 211.14

(56) References Cited

U.S. PATENT DOCUMENTS

| | | | |
|---|---|---|---|
| 3,118,012 A | * 1/1964 | Kilian | 264/211.14 |
| 5,145,623 A | 9/1992 | Hendrix, Jr. et al. | 264/103 |
| 5,250,245 A | 10/1993 | Collins | 264/103 |
| 5,288,553 A | 2/1994 | Collins | 264/103 |
| 5,370,833 A | * 12/1994 | Wellenhofer et al. | 264/169 X |
| 5,407,621 A | 4/1995 | Collins | 264/103 |
| 5,536,157 A | 7/1996 | Linz | 425/72.2 |
| 5,866,055 A | 2/1999 | Schwartz et al. | 264/103 |
| 6,511,624 B1 | * 1/2003 | Cho et al. | 264/211.14 X |

* cited by examiner

Primary Examiner—Leo B. Tentoni
(74) Attorney, Agent, or Firm—Bacon & Thomas

(57) ABSTRACT

Manufacturing method for polyester fine denier multifilament. The length of a protective delay shroud of the radial outer-flow quenching system used in melt spinning process for manufacturing fine hollow polyester filaments is expressed as (2~8060×throughput÷filaments square), and the length of quenching air tube is from 15 to 40 centimeters. The velocity of quenching air is between 0.2 m/sec to 0.6 m/sec. For the layout of the spinneret orifices, the diameter difference of outermost layer orifice and the innermost layer orifice is set less than 20 mm; and the distance between the diameter of innermost orifice layout and the diameter of quenching air tube is at least 12 and less than 33 mm. The orifice density of spinneret layout (orifice density) is set as 7~15 orifices per square centimeter.

4 Claims, 6 Drawing Sheets

PROCESS OF MAKING POLYESTER FINE DENIER MULTIFILAMENT

FIELD OF THE INVENTION

This invention relates to a manufacturing method of polyester fine denier multifilament, polyester fine denier multifilament made from the same and polyester fine denier multifilament yarns.

RELATED ART

Polyester fiber is mostly used among three major synthetic fiber owing to its good mechanical features, dyeability and low cost. In the recent, demands in hand softness and functionality is highly desired accompanied with application of fabrics in high grade dress material, woven fabrics knitted or woven from fine denier of d.p.f.(denier per filament) synthetic fiber such as polyester fiber and its fur-like fabrics. Manufacturing process of polyester filament is approximately as follows: polycondensation reaction of terephthalic acid and ethylene glycol to form polyester chip or melt mass, after melting, extrusion, measuring and throughput, then quenching, oil finishing and winding up. In this process, the quenching effect of the polyester tow throughput after melt extrusion is very important to physical property and uniformity of yarn.

The common quenching method presently available: cross flow quenching system (as shown in FIG. 1). Radial out-to-in flow quenching system (as shown in FIG. 2). Radial in-to-out flow quenching system (as shown in FIG. 3). Respectively explained as follows: in cross flow quenching system, after throughput from spinneret, the filament tow is cooled one-side by quenching air; in radial out-to-in flow quenching system, after throughput from spinneret, the filament tow passing the internal part of quenching air tube, is in-to-out cooled by quenching wind along circumference of air tube; in radial in-to-out flow quenching system, after throughput from spinneret, the filament tow passing the external part of quenching air tube, is in-to-out cooled by quenching wind along circumference of air tube.

Presently among above major blowing modes, the cross flow quenching system is mostly used, the radial out-to-in flow quenching system and radial in-to-out flow quenching system are frequently applied in staple, and partly used in industrial yarn production.

DETAILED DESCRIPTION OF THE INVENTION polyester fine denier multifilament yarns of d.p.f. below 0.3 d is made into cloth and fabric to reach the purpose of vapor permeation, water proof and pilling resistance to exhibit the outstanding effect. There is a popularly adopted method to manufacture said filaments of d.p.f. less than 0.3, which use two-component melt spinning method, to manufacture filament of higher denier previously, then subject it to mechanical splitting or chemical splitting to form microfiber of d.p.f. less than 0.3. However, beside the equipment invested in the above mentioned method to manufacture filament tow of higher denier first by two-component conjugate spinning, then texturing to treat these filament tow is very expensive, the process used in the latter portion is very complicated due to chemical reduction or mechanical splitting, and quality control for said filaments is uneasy. This is not suitable for mass production.

There are two existing methods to reduce d.p.f. of single component polymer can be adopted, one is maintaining total throughput of polyester melt in constant amount and increasing the number of orifice on spinneret, and the other is maintaining total the number of orifice on spinneret and reducing total throughput of polyester melt. But for the spinning stage of the former method, the amount of spinneret orifices will be increased due to the narrower degree of d.p.f. For the quenching and blowing mode of polyester filament melt spinning quenching and blowing, cross flow quenching system is mainly adopted and supported with less out-to-in flow quenching system, of course, the quenching and blowing mode for melt spinning of existing polyester fine denier multifilament also mainly use these two modes, however, if cooled with the quenching unit of cross flow quenching system, it will lead to large quenching difference between the filament tow with single face exposed to the quenching air near the wind front and the filament tow far away from wind front. Uneven quenching of filament tow, especially quenching difference increased in case of increasing the number of spinneret orifices due to the increase of the number of orifices in unit area of spinneret(orifice density), it will lead to insufficient quenching and fail to obtain the required fine denier and uniformity. Furthermore, it will be more serious for the case of d.p.f. less than 0.3 denier. The other way aims to reduce the total throughput of polyester melt, but it usually decreases output and requires the mode of conjugate spinning, and often creates dyeing problem due to the variance of physical property in individual yarn of the conjugate yarn.

For radial out-to-in flow quenching system, insufficient quenching of filament tow due to difficult regulation of quenching air, slow quenching air speed will lead to high uster half inert value(u $\%_{1/2}$ inert), even more seriously, the failure of smooth spinning due to the mutual adhesion among monofilament; The unstable filament tow, mutual collision of monofilament and bad process will occur due to over high quenching air speed, mutual interference in quenching air in reversed blowing direction; Furthermore, the filament tow is uneasy to enter into narrow quenching air tube, and bad operability also adverse to the production of polyester fine denier multifilament. How to reduce d.p.f. (denier per filament) and increase stable production without sacrificing output, has become the subject matter that the polyester fine denier multifilament manufacturer anxious for, these are disclosed by such as U.S. Pat. Nos. 5,288,553, 5,145,623, 5,407,621 and 5,250,245 concerning the spinning conditions how to select polyester chip of particular I.V. choosing the orifice diameter and orifice length of spinneret, and limiting the retention time of polyester melt in the pipeline on the production of polyester fine denier multifilament of d.p.f. 0.2~0.8. But, these United States patents did not disclose what quenching method used, and with the length of protective delay shroud from 2 cm to $(12\times(d.p.f.)^{1/2})$ cm, the expected uster half inert value(u $\%_{1/2}$ inert) less than 0.3% and variation of thermal stress in spindles less than 2% can not be achieved due to overlong protective delay shroud besides increasing the orifice density (orifice/cm$^2$).

As to another Japanese Patent Laid-Open Application No. 1980-132708, a manufacturing method for d.p.f, less than 0.3 denier of polyester, polyamide, polyolefin filament is disclosed by controlling the melt viscosity less than 950 poises when spun, the temperature beneath the spinneret 1~3 cm is kept at less than 200° C., the quenching air is blown within 10 cm beneath the spinneret in the way of forming an angle 5° to 85° with horizontal line onto the filament tow. But this method can not spin stably due to the spinneret surface is apt to be affected by the quenching air to cause uneven temperature.

Radial out-to-in flow quenching system, as stated in U.S. Pat. Nos. 5,536,157 and 5,866,055, is designed to produce polyester industrial yarn with d.p.f. 1.1 to 22.2 d, and fails to disclose the manufacturing process for polyester fine denier multifilament.

By carefully reviewing previous technologies, processing conditions and quenching units in the polyester filament manufacturing, the inventor discovers that polyester polymer with specific intrinsic viscosity and melting point, is uniformly throughput from spinneret with a multi-layer annularly arranged orifices (the diameter difference of outermost layer orifice and the innermost orifice is set at $\leq 20$ mm), quenched by cylindrical quenching air tube with quenching air in-to-out radial blowing, wound and packaged into filament package to accomplish this invention. Uster half inert value(u $\%_{1/2}$ inert) less than 0.3% and variation of thermal stress in spindles less than 2% of polyester fine denier multifilament in this invention can be achieved by increasing the number in unit spinneret area set as 7~21 orifices per square centimeter. After draw texturing process, the polyester fine denier multifilament obtained has excellent dyeability and no dyeing streak in woven fabric.

SUMMARY OF THE INVENTION

It is an object of this invention to provide a manufacturing method for polyester fine denier multifilament, which is heating polyester polymer of inherent viscosity(IV) 0.5~0.7 and melting point of 245~265° C. to melt, filter and extruding in constant amount to obtain polyester fine denier multifilament, characterized in comprising the following steps:

a. uniformly spinning said constant amount extruded polyester melt through a multi-layer annularly arranged spinneret orifices (as shown in FIG. 5) to obtain the filament tow, wherein the diameter of outermost layer orifice is set as $D_2$ mm, and the diameter of inmost layer orifice is set as $D_1$ mm;

b. passing said spun filament tow under spinneret through a protective delay shroud of length $L_s$ mm and a cylindrical quenching air tube of length $L_q$ mm and diameter of $D_0$ mm which offers the radial outer-flow quenching air at wind speed of 0.2–0.6 meter/second to said filament tow from the outer side of said cylindrical quenching air tube to uniformly cooled to below glass transition point ($T_g$) of said polyester polymer for bundling;

c. said $D_2$, $D_1$, $D_0$, $L_s$, $L_q$ satisfying the following requirements:
 (i) $D_2-D_1 \leq 20$ (mm)
 (ii) $12 \leq D_1-D_0 \leq 33$ (mm)
 (iii) $2 \leq Ls \leq 20$ (mm)
 (iv) $15 \leq Lq \leq 40$ (cm)

d. winding said filament tow at the speed of 1800 to 4000 meter/minute.

The other object of this invention is to provide a radial out-to-in flow quenching system of enabling uniform quenching for filament tow, to produce polyester fine denier multifilament. The length of protective delay shroud below spinneret is preferably set at 2 to 20 mm, when the length of protective delay shroud is less than 2 mm, the quenching air will influence surface temperature of spinneret, deteriorate production status, and the polyester fine denier multifilament obtained after draw texturing process has poor dyeability and dyeing streak in woven fabric; when the length of protective delay shroud is over 20 mm, the uster half inert value (u $\%_{1/2}$ inert) of polyester fine denier multifilament becomes larger, even if increasing quenching air speed, it fails to meet the requirement for polyester fine denier multifilament with expected uster half inert value(u $\%_{1/2}$ inert) less than 0.3%, and the finished fabric manufactured from the polyester fine denier multifilament after draw texturing process, has poor dyeability itself, dyeing streak in woven fabric.

For the layout of the spinneret orifices adopted in this invention (as shown in FIG. 5), the diameter difference of outermost layer orifice and the innermost layer orifice is set less than 20 mm; If the diameter difference of outermost layer orifice and the innermost layer orifice is greater than 20 mm, it will lead to larger quenching air difference between the inner and external filament tow, and large difference in physical property among monofilament inside filament tow, and fabric in excellent dyeability can not be achieved. The distance between the diameter of innermost orifice layout and the diameter of quenching air tube is at least 12 and less than 33 mm. When the distance between the diameter of innermost orifice layout and the diameter of quenching air tube is less than 12 mm, normal spinning fails due to easy touch with quenching air tube and broken; While the distance between the diameter of innermost orifice layout and the diameter of quenching air tube is greater than 33 mm, it will reduce quenching efficiency in quenching air tube, and breakage in filament due to insufficient quenching at outermost layer diameter of spinneret.

To obtain appropriate quenching for filament tow, the quenching air tube used in this invention is preferably set as 15 to 40 cm. when the length of quenching air tube is less than 15 cm, the filament tow will be adhered and broken due to insufficient quenching; when the length of quenching air tube is greater than 40 cm, turbulent flow will occur and deteriorate uster half inert value (u $\%_{1/2}$ inert); The quenching air tube used in this invention is a cylindrical shape, can be manufactured by multilayer cellulose or multilayer wire netting or filter sintered from metal or ceramic, or multilayer perforated plate; The filament tow can be obtained by blowing quenching air uniformly out in a way of radial in-to-out from fine holes of said quenching air tube. The velocity of quenching air in this invention is preferably set as 0.2 m/sec to 0.6 cm/sec. when the velocity of quenching air is less than 0.2 m/min, the filament tow will be adhered and broken due to insufficient quenching, also accompanied by greater uster half inert value (u $\%_{1/2}$ inert). When the velocity of quenching air is greater than 0.6 cm/sec, it fails to reduce the uster half inert value and do no evident improvement on uster half inert value, causing super quenching to break the filament tow.

The orifice density of spinneret layout (orifice density) is set as 7~21 orifices per square centimeter. The orifice density(as shown in FIG. 5), is defined as the number of throughput orifices between $D_2$ (the diameter of outermost layer orifice) and $D_1$ (the diameter of inmost layer orifice) divided by area between $D_2$ and $D_1$, i.e. the number of orifices (between $D_2$ and $D_1$)$\times 4/\pi \times (D_2{}^2-D_1{}^2)$.

The section of above mentioned spinneret orifice can be selected from one or more than one of the group of circular, hollow, Y type, —shape type, square shape, triangular shape, hexagonal shape, cross shape and C shape in the manufacturing method for polyester fine denier multifilament of this invention.

Economic benefit is reduced due to the total throughput have to be reduced in case of orifice density less than 7 holes per square centimeter in order to satisfy the requirement for d.p.f. 0.3~2.0 in this invention as well as conjugate spinning;

Stable spinning fails due to large uster half inert value (u %$_{1/2}$inert), quenching difference among monofilament caused by compact layout among monofilament in case of orifice density exceeding 21 orifices per square centimeter.

The inherent viscosity (IV) of polyester chip used in this invention is between 0.5 to 0.7, after melting, the polyester chip is extruded from spinneret to spin to form filament, then is subject to drawing, quenching, oil finishing and winding to get the polyester fine denier multifilament. The polyester fine denier multifilament produced has elongation at break between 100% to 160%, d.p.f. of 0.3 to 2.0, and uster half inert value (u %$_{1/2}$inert) less than 0.3%; variation of thermal stress in spindles less than 2%. Consequently, polyester fine denier multifilament yarn with excellent dyeability and d.p.f. of 0.2 to 1.0 can be achieved after draw texturing such as draw twisting, air twisting or one stage direct spin drawing process (spin draw).

Analytical Procedures a. Variation of Thermal Stress in Spindles:
Analytical apparatus:
Textechno Dynafil M Type DPG/M
Analysis condition:
Draw ratio 1.6, heating temperature 150° C., analyzing speed 50 M, analyzing time 1 min.
By sampling specimens from a cake for every doffing to be tested, analyzing the thermal stress according to the above mentioned conditions, variation of thermal stress in spindles can be calculated by using instrument.

b. Uster Half Inert Value (u %$_{1/2}$inert):
Analytical apparatus:
USTER TESTER 3
Analyzing speed: 400 m/min, analyzing time: 2.5 min
Analyzing length: 1000 m
By sampling specimens from a cake for every doffing to be tested, analyzing the uster half inert value according to the above mentioned conditions, uster half inert value (u %$_{1/2}$inert) can be calculated by using instrument.

c. d.p.f. (Denier Per Filament):
Winding filament tow 90 loops, weighing (weight shown in a gram), multiply a with 100 to get total denier b of filament tow. The b is divided by c, the number of filament in filament tow to get d.p.f. (denier per filament)

d. Tensile Strength of Elongation at Break:
Analytical apparatus:
Textecho Type FPA/M
Analyzing condition: analyzing length 10 centimeters, drawing rate 60 cm/min. pre-load 0.5 cN/tex. The strength is the maximum strength, and the corresponding elongation is elongation at break.

e. Woven Fabrics Dyeability:
Fabric texture: satin is woven by 75d/36f textured yarn in warp with warp density of 150 strip per inch, and weft yarn manufactured by this invention with weft density regulated in d.p.f.
Dyeing and finishing condition: using disperse dyestuff to dye for 130° C.×130 min, after drying the dyed and finished fabric, checking if striation exists across wary under natural light.

Striation Grade:
Excellent (◯): Dyed and finished fabric has uniform gloss at the surface under natural light
Fair (△): Dyed and finished fabric has little degree of short chatter(less than 1 centimeter) under natural light.
Streak (x): Dyed and finished fabric has long chatter (greater than 1 centimeter) under natural light.

Figure 1:
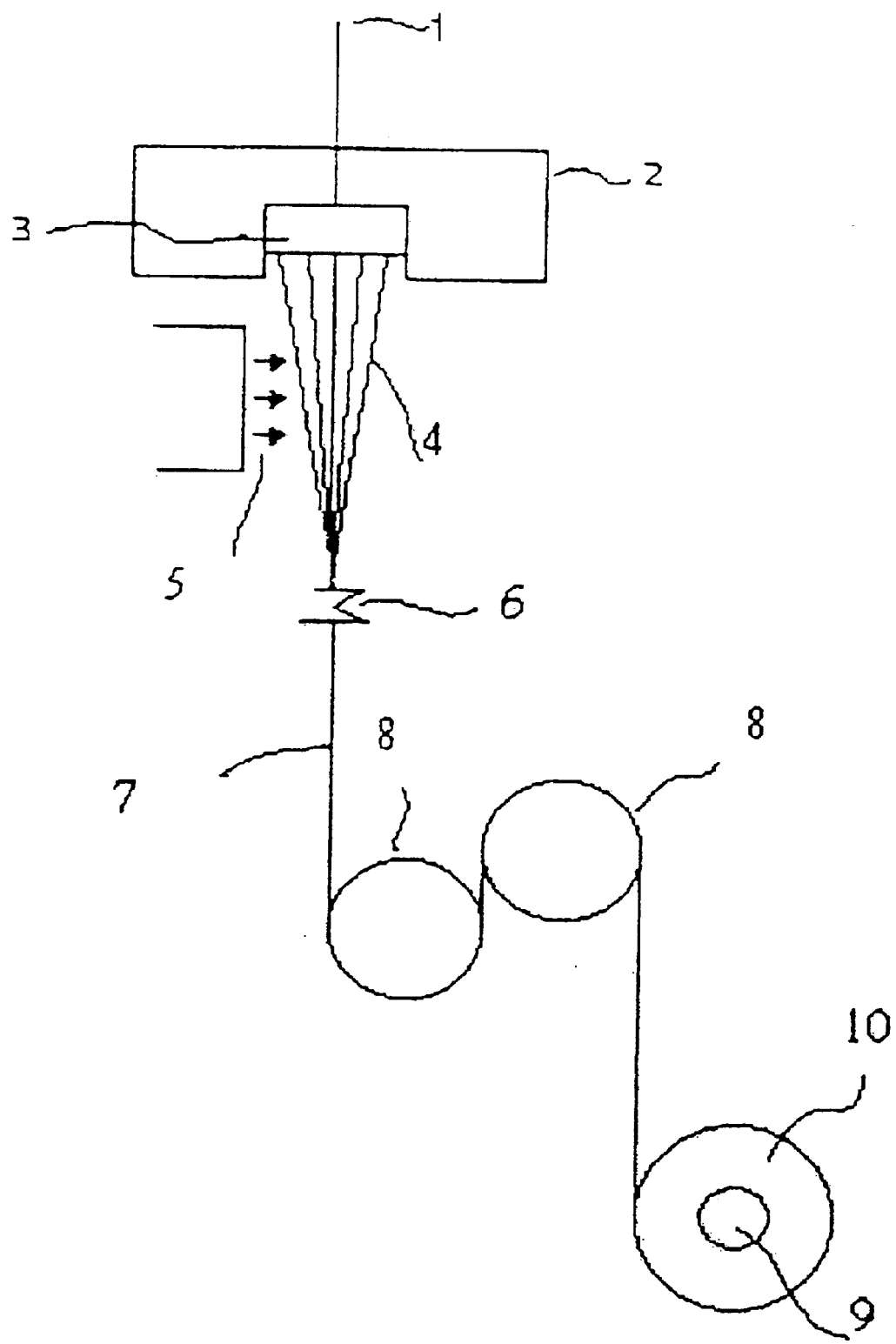
FIG. 1 shows a schematic diagram of a conventional cross flow quenching system.

In the conventional cross flow quenching system shown in FIG. 1, quenching air is blown from one side to the filament tow throughput from the spinneret to cool said filament tow.

Figure 2:
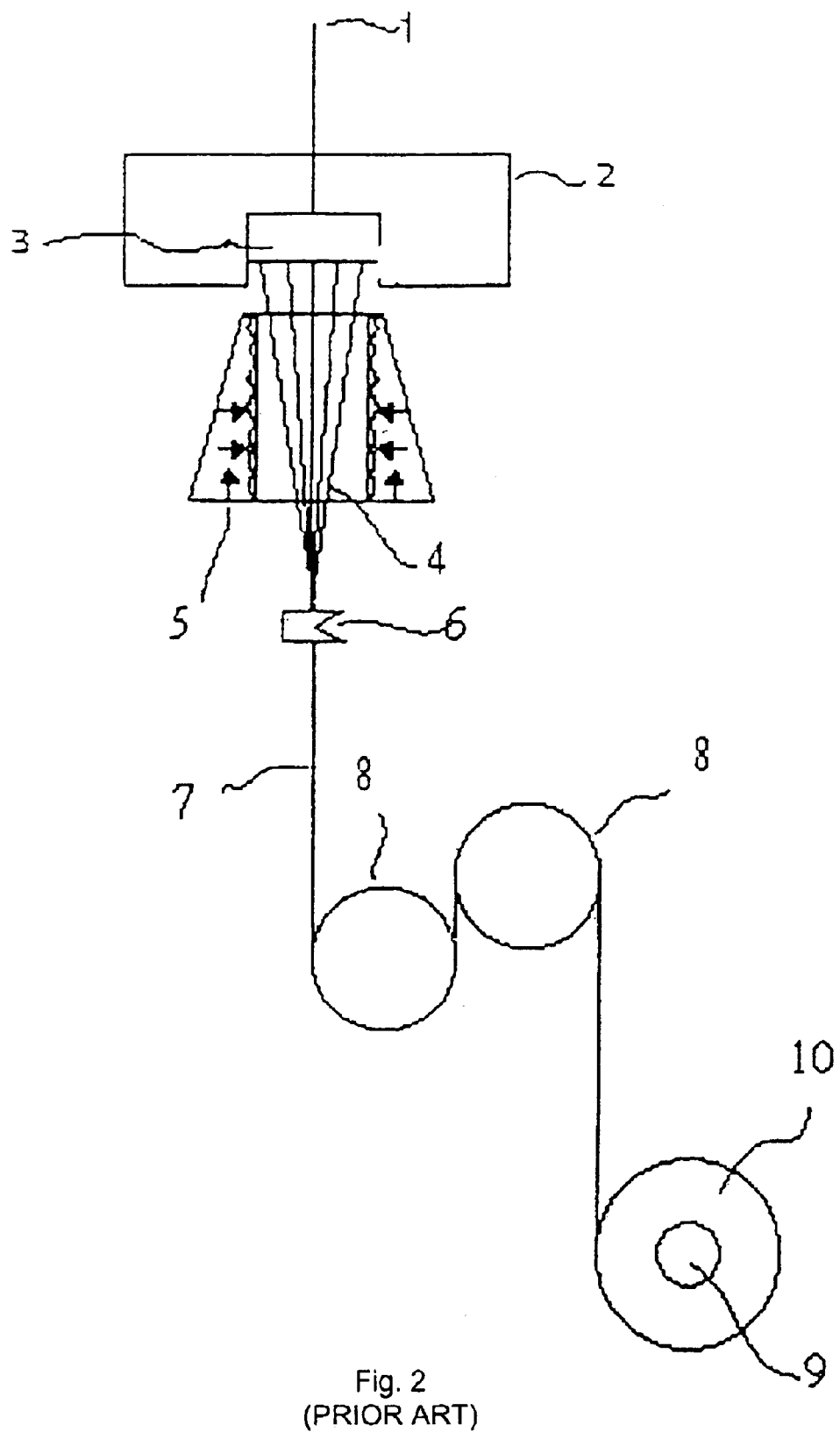
FIG. 2 shows a schematic diagram of a known radial out-to-in flow quenching system.

In the known radial out-to-in flow quenching system shown in FIG. 2, quenching air is blown radially from the wall of quenching air tube that surround the filament tow throughput from the spinneret, quenching air is blown to the center portion of said filament tow all around from said filament tow to cool said filament tow. In the radial in-to-out flow quenching system used in this invention shown in FIG. 3, quenching air is blown radially from the wall of quenching air tube that locate at the center portion of the filament tow throughput from the spinneret, quenching air is blown to the surrounding of said filament tow from the center portion of said filament tow to cool said filament tow.

Figure 4:
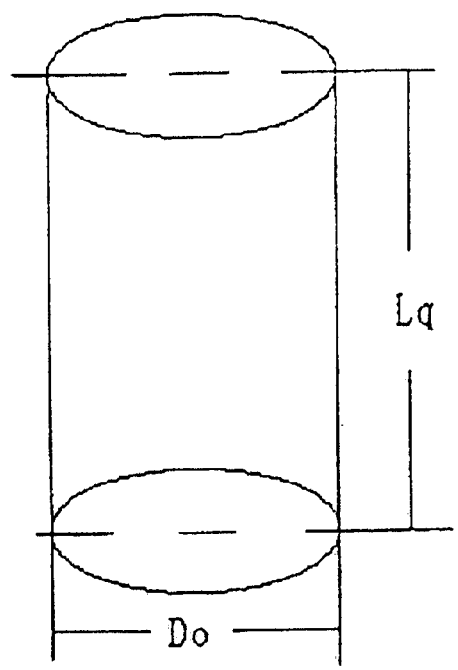
FIG. 4 shows a schematic diagram of cylindrical quenching air tube of a radial in-to-out flow quenching system used in this invention.

In the process of the radial in-to-out flow quenching system shown in FIG. 4, the quenching air tube has length Lq and outer diameter Do.

Figure 3:
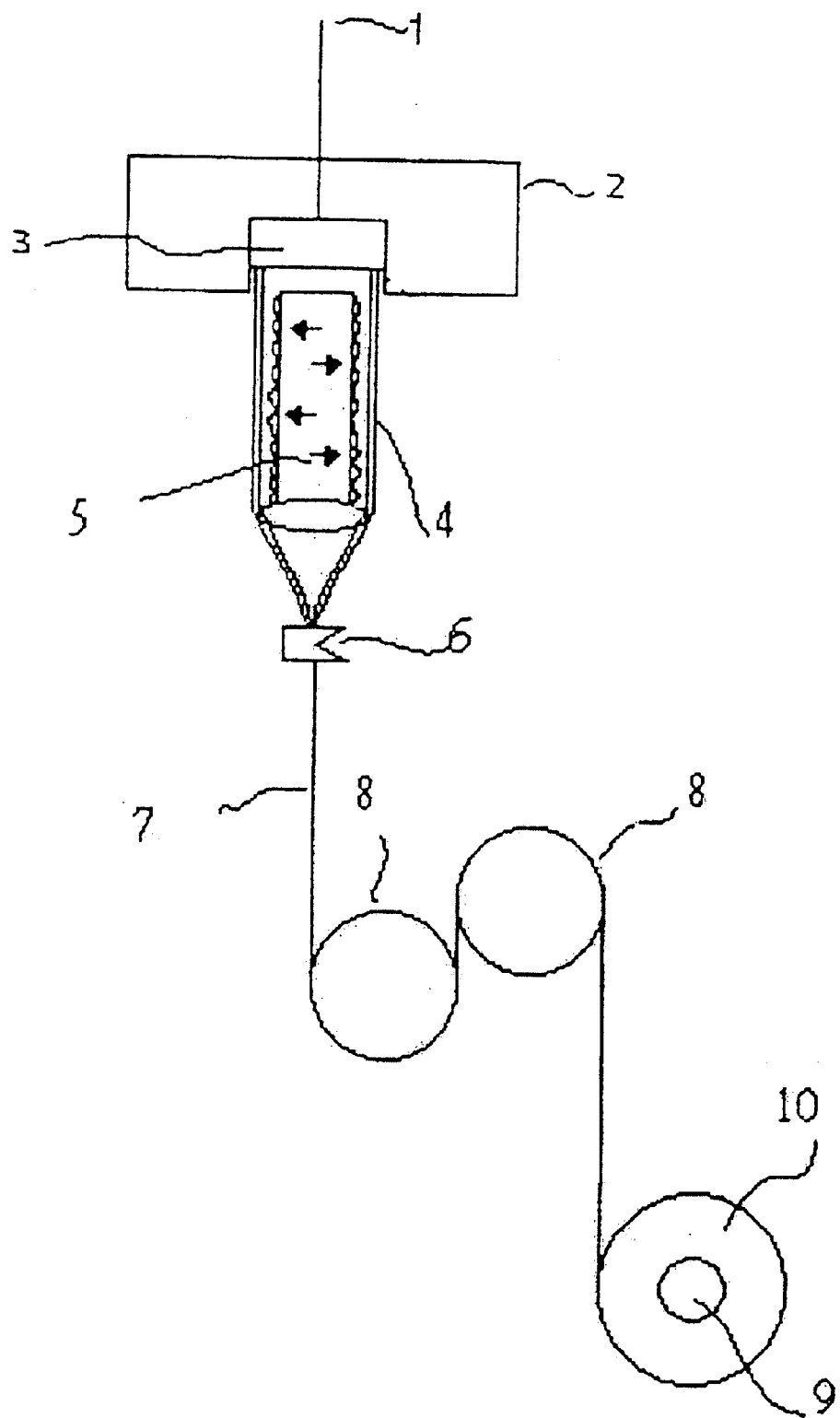
FIG. 3 shows a schematic diagram of a radial in-to-out flow quenching system used in this invention.
Figure 5:
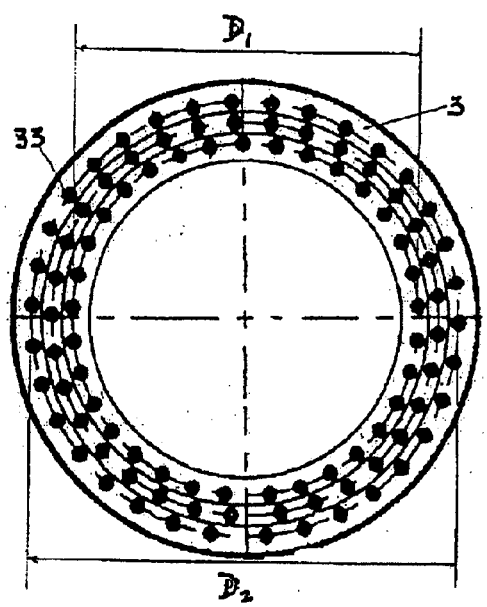
FIG. 5 shows a layout of orifices of spinneret used in this invention.

In the process of the radial in-to-out flow quenching system shown in FIG. 3, the spinneret used is shown as FIG. 5.

Figure 6:
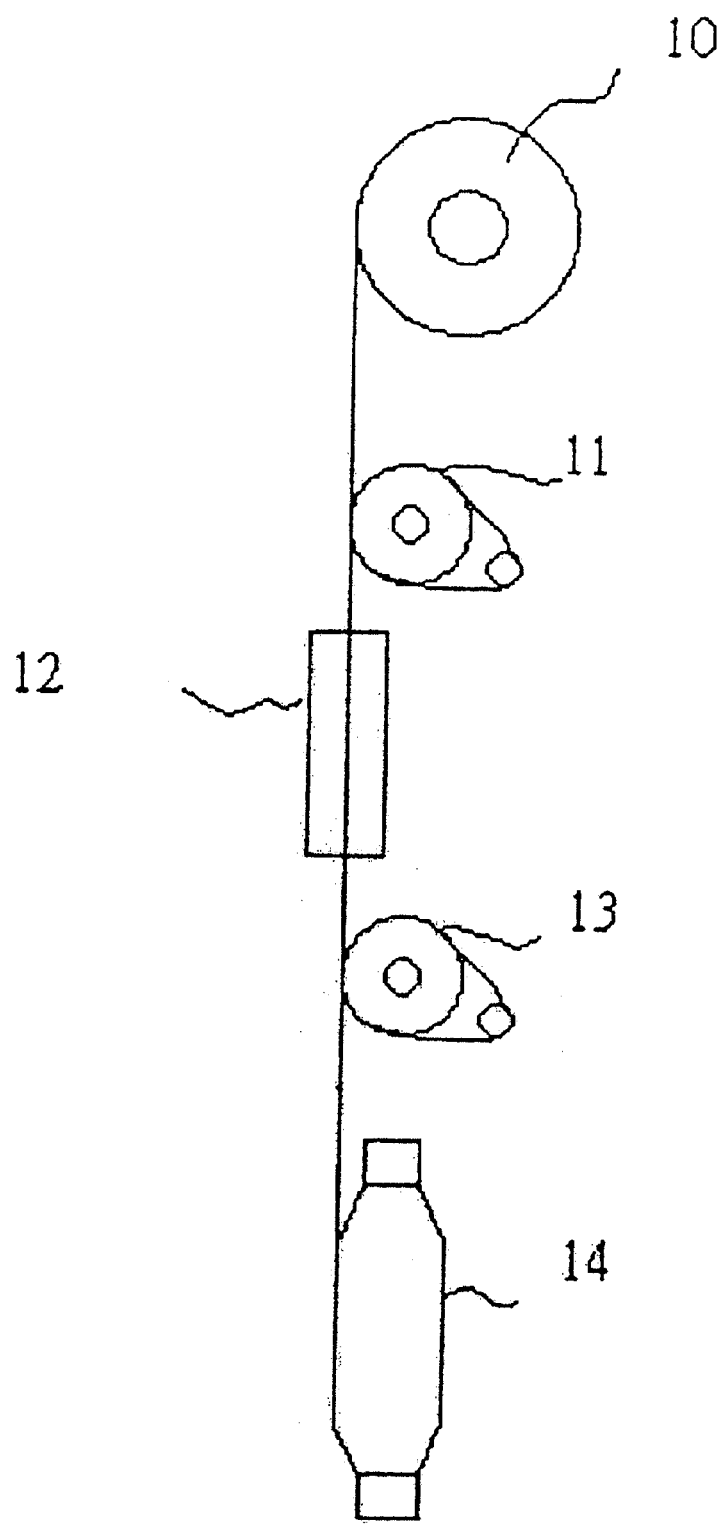
FIG. 6 shows a draw twister for draw texturing used in this invention.

The polyester fine denier multifilament 10 manufactured from the process of the radial in-to-out flow quenching system shown in FIG. 3, is drawn by the draw twister shown in FIG. 6 to get fine hollow polyester yarn 14.

Figure 7:
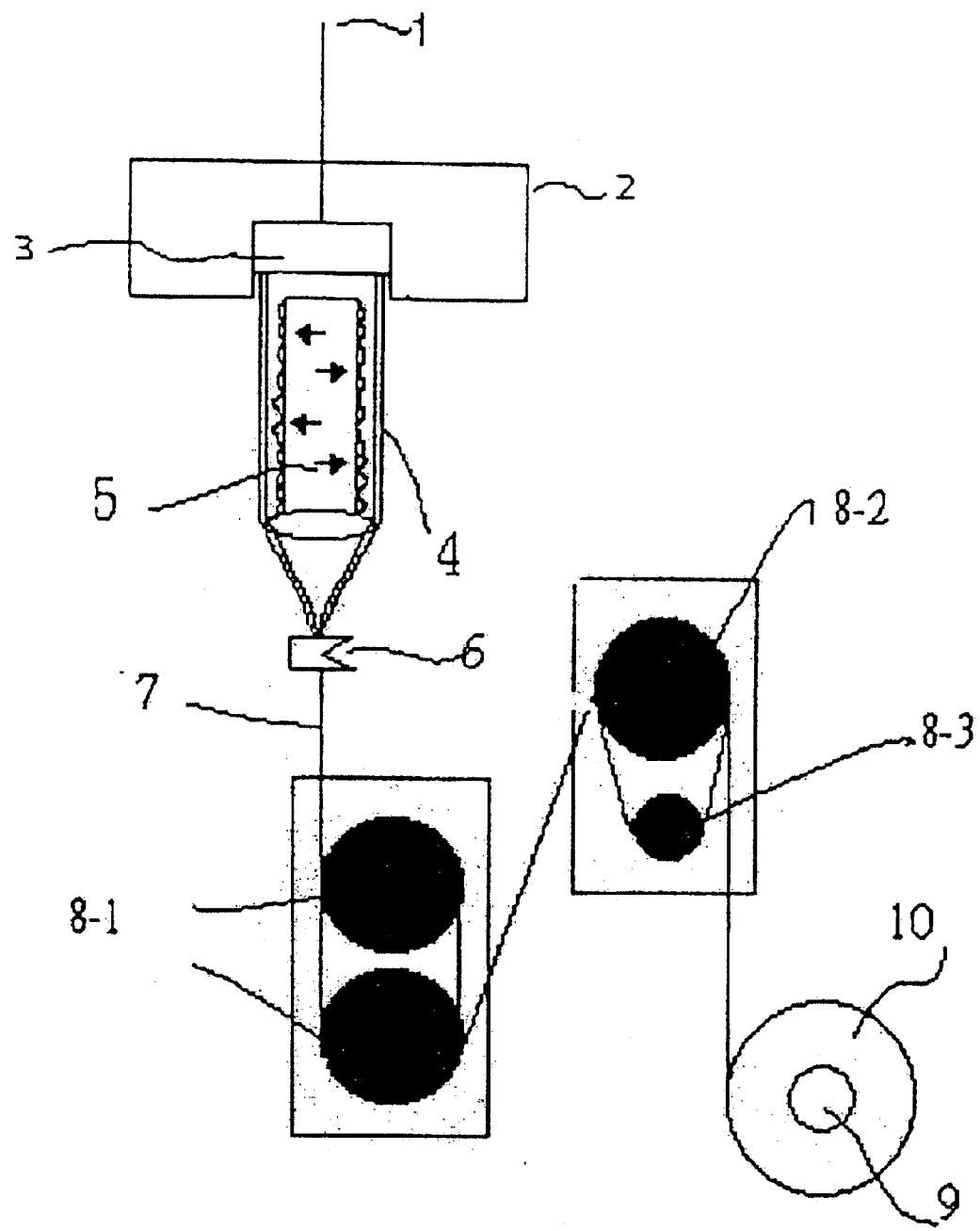
FIG. 7 shows a schematic diagram of direct spin draw in a radial in-to-out flow quenching system used in this invention.

In the process of the radial in-to-out flow quenching system used in this invention shown in FIG. 7, quenching air is blown radially from the wall of quenching air tube that locate at the center portion of the filament tow throughput from the spinneret, quenching air is blown to the surrounding of said filament tow from the center portion of said filament tow to cool said filament tow.

Numerals used in the drawings are meant as follows.

1 polyester melt
2 spinning head
3 spinneret
33 orifice
4 filament tow
5 quenching air tube
6 oiling nozzle
7 filament tow after bundling
8 non-heating roller
8-1 heating roller
8-2 heating roller
8-3 separating wheel
9 winding machine
10 polyester fine denier multifilament cake
11 heating roller 12 heater
13 heating roller
14 polyester fine denier multifilament yarn package

EXAMPLE AND COMPARATIVE EXAMPLE

Example 1~3 and Comparative Example 1~3

Polyester fine denier multifilament of circular section is made according to the condition listed in table 1, wherein radial in-to-out flow quenching system (as shown in FIG. 3) is used in example 1~3 and comparative example 1, cross flow quenching system (as shown in FIG. 1) is used in comparative example 2~3 of this invention. Polyester fine denier multifilament having uster half inert value (u $\%_{1/2i}$nert) less than 0.3% and variation of thermal stress in spindles less than 2% of example 1~3 obtained in this invention evidently verified to have excellent (○) dyeability of woven fabrics after the polyester fine denier multifilament obtained is subjected to draw texturing process.

Except the length of protective delay shroud Ls (mm) used in comparative example 1 is set at 45 mm, the other conditions are the same as example 1. As to comparative example 1, uster half inert value (u $\%_{1/2i}$nert) is larger (0.55%), and dyeability of woven fabrics after the polyester fine denier multifilament obtained in comparative example 1 is subjected to draw texturing process is fair (Δ).

Except the quenching mode used in comparative example 2~3 is cross flow quenching system, the other conditions are the same as example 3. As to comparative example 2, though the length of protective delay shroud Ls (mm) used in comparative example 1 is set at 15 mm which is fallen within the expected range of 2~20 mm, but the filament faraway the wind front is not well quenched. Uster half inert value (u $\%_{1/2}$ inert) is as large to 0.85%, and dyeability of woven fabrics after the polyester fine denier multifilament obtained in comparative example 2 is subjected to draw texturing process is streak (x).

As to comparative example 3, the length of protective delay shroud Ls (mm) used in comparative example 3 is set at 45 mm which is beyond the expected range of 2~20 mm, filament will collide each other seriously and not able to produce polyester fine denier multifilament.

TABLE 1

|  |  | Item Example | | | | | |
|---|---|---|---|---|---|---|---|
|  |  | Example 1 | Example 2 | Example 3 | Comparative Example 1 | Comparative Example 2 | Comparative Example 3 |
| Spinning Condition | IV of polyester chip | 0.64 | 0.64 | 0.52 | .064 | 0.52 | 0.52 |
|  | Dowtherm temperature (° C.) | 295 | 298 | 292 | 295 | 292 | 292 |
|  | d.p.f. of polyester fine denier multifilament (denier) | 160 | 80 | 80 | 160 | 80 | 80 |
|  | d.p.f. of polyester fine denier filaments (denier) | 0.55 | 0.37 | 0.37 | 0.55 | 0.37 | 0.37 |
|  | Length of protective delay shroud Ls(mm) | 4 | 15 | 15 | 45 | 15 | 45 |
|  | quenching mode | Radial in-to-out flow quenching | Radial in-to-out flow quenching | Radial in-to-out flow quenching | Radial in-to-out flow quenching | Cross flow quenching | Cross flow quenching |
|  | Length of quenching air tube Lq(cm) | 40 | 35 | 35 | 40 | 100 | 100 |
|  | Diameter of quenching air tube $D_0$ (mm) | 30 | 30 | 30 | 30 | — | — |
|  | Quenching air velocity (m/sec) | 0.45 | 0.35 | 0.35 | 0.45 | 0.60 | 0.60 |
|  | Orifice density (orifice/cm$^2$) | 14 | 20 | 20 | 14 | 6 | 6 |
|  | Orifice of spinneret | 288 | 216 | 216 | 288 | 216 | 216 |
|  | Diameter of innermost layer orifice $D_1$(mm) | 49 | 49 | 49 | 46.5 | 12 | 12 |
|  | Diameter of outermost layer orifice $D_2$(mm) | 61 | 60 | 61 | 69 | 69 | 69 |
|  | Winding velocity (m/min) | 2500 | 2250 | 2500 | 2300 | 2300 | 2500 |
| Physical Properties Of Polyester Fine | d.p.f. (den) | 0.35 | 0.25 | 0.25 | 0.35 | 0.25 | Unable to produce |
|  | Tensile strength (g/den) | 4.55 | 4.56 | 4.32 | 4.60 | 4.30 |  |
|  | Elongation at break (%) | 23 | 23 | 25 | 24 | 23 |  |

TABLE 1-continued

|  |  | Example 1 | Example 2 | Example 3 | Comparative Example 1 | Comparative Example 2 | Comparative Example 3 |
|---|---|---|---|---|---|---|---|
| Denier Multifilaments | uster half inert value (u % $_{1/2}$inert) | 0.27 | 0.25 | 0.29 | 0.55 | 0.85 |  |
|  | Variation of thermal stress in spindles (%) | 1.5 | 1.7 | 1.9 | 2.9 | 3.0 |  |
|  | Dyeability of woven fabrics | excellent (○) | excellent (○) | excellent (○) | fair (Δ) | streak (X) |  |

Example 4~5 and Comparative Example 4~5

Polyester fine denier multifilament of Y-shape section is made according to the condition listed in table 2, wherein radial in-to-out flow quenching system (as shown in FIG. 3) is used in example 4~5, and cross flow quenching system (as shown in FIG. 1) is used in comparative example 4~5 of this invention. Polyester fine denier multifilament having uster half inert value (u %$_{1/2}$inert) less than 0.3% (0.29% and 0.25% respectively) and variation of thermal stress in spindles less than 2% of example 4~5 (1.8% and 1.7% respectively) obtained in this invention evidently verified to have excellent (○) dyeability of woven fabrics after the polyester fine denier multifilament obtained is subjected to draw texturing process.

Except the quenching mode used in comparative example 4~5 is cross flow quenching system, the other conditions are the same as example 4~5. As to comparative example 4~5, though the length of protective delay shroud Ls (mm) used in comparative example 4~5 is set at 15 mm respectively which is fallen within the expected range of 2~20 mm, but the filament faraway the wind front is not well quenched. Uster half inert value (u %$_{1/2}$inert) is as large to 0.55% and 0.70% respectively, and dyeability of woven fabrics after the polyester fine denier multifilament obtained in comparative example 4~5 are subjected to draw texturing process is streak (x).

TABLE 2

|  |  | Example 1 | Example 2 | Comparative Example 1 | Comparative Example 2 |
|---|---|---|---|---|---|
| Spinning Condition | IV of polyester chip | 0.64 | 0.64 | .064 | 0.52 |
|  | Dowtherm temperature (° C.) | 295 | 295 | 295 | 295 |
|  | d.p.f. of polyester fine denier multifilament (denier) | 127 | 87 | 127 | 87 |
|  | d.p.f. of polyester fine denier filaments (denier) | 0.88 | 0.60 | 0.88 | 0.60 |
|  | Length of protective delay shroud Ls(mm) | 15 | 15 | 15 | 15 |
|  | quenching mode | Radial in-to-out flow quenching | Radial in-to-out flow quenching | Cross flow quenching | Cross flow quenching |
|  | Length of quenching air tube Lq(cm) | 40 | 35 | 100 | 100 |
|  | Diameter of quenching air tube D$_0$ (mm) | 30 | 30 | — | — |
|  | Quenching air velocity (m/sec) | 0.25 | 0.25 | 0.5 | 0.5 |
|  | Orifice density (orifice/cm$^2$) | 14 | 14 | 3.97 | 3.97 |
|  | Orifice of spinneret | 144 | 144 | 144 | 144 |
|  | Diameter of innermost layer orifice D$_1$(mm) | 49 | 49 | 12 | 12 |
|  | Diameter of outermost layer orifice D$_2$(mm) | 61 | 61 | 69 | 69 |

TABLE 2-continued

|  |  | Item Example | | | |
|---|---|---|---|---|---|
|  |  | Example 1 | Example 2 | Comparative Example 1 | Comparative Example 2 |
|  | Winding velocity (m/min) | 2300 | 2300 | 2300 | 2300 |
| Physical Properties Of Polyester Fine Denier Multifilaments | d.p.f (den) | 0.88 | 0.35 | 0.88 | — |
|  | Tensile strength (g/den) | 5.3 | 5.1 | 4.8 | 4.7 |
|  | Elongation at break (%) | 29 | 25 | 30 | 27 |
|  | uster half inert value (u % $_{1/2}$inert) | 0.29 | 0.25 | 0.55 | 0.70 |
|  | Variation of thermal stress in spindles (%) | 1.8 | 1.7 | 2.9 | 2.7 |
|  | Dyeability of woven fabrics | excellent (○) | excellent (○) | streak (X) | streak (X) |

What is claimed is:

1. A manufacturing method for polyester fine denier multifilament, which is heating polyester polymer of inherent viscosity(IV) 0.5~0.7 and melting point of 245~265° C. to melt, filter and extruding in constant amount to obtain polyester fine denier multifilament, characterized in comprising the following steps:

a. uniformly spinning said constant amount extruded polyester melt through a multi-layer annularly arranged spinneret orifices to obtain the filament tow, wherein the diameter of outermost layer orifice is set as $D_2$ mm, and the diameter of innermost layer orifice is set as $D_1$ mm;

b. passing said spun filament tow under spinneret through a protective delay shroud of length $L_s$ mm and a cylindrical quenching air tube of length $L_q$ mm and diameter of $D_0$ mm which offers the radial outer-flow quenching air at wind speed of 0.2–0.6 meter/second to said filament tow from the outer side of said cylindrical quenching air tube to uniformly cooled to below glass transition point ($T_g$) of said polyester polymer for bundling;

c. said $D_2, D_1, D_0, L_s, L_q$ satisfying the following requirements:

(i) $D_2-D_1<20$ (mm)
(ii) $12<D_1-D_0<33$ (mm)
(iii) $2<L_s<20$ (mm)
(iv) $15<L_q<40$ (cm)

d. winding said filament tow at the speed of 1800 to 3000 meter/minute.

2. The manufacturing method for polyester fine denier multifilament according to claim 1, wherein, the orifice density of spinneret layout (orifice density) is set as 7~21 orifices per square centimeter.

3. The manufacturing method for polyester fine denier multifilament according to claim 1, wherein, the section of said spinneret orifice is selected from one or more than one of the group of circular, hollow, Y type, — shape type, square shape, triangular shape, hexagonal shape, cross shape and C shape.

4. The manufacturing method for polyester fine denier multifilament according to claim 1, wherein, the polyester fine denier multifilament obtained has 0.3 to 2.0 denier per filament (d.p.f), uster half inert value (u % ½ inert) less than 0.3%, variation of thermal stress in spindles less than 2%, elongation at break from 100 to 160%.

* * * * *